(12) United States Patent
Walter et al.

(10) Patent No.: US 10,118,775 B2
(45) Date of Patent: Nov. 6, 2018

(54) MODULAR SYSTEM OF A PLURALITY OF TRANSPORT LINE COMPONENTS OF A LONG STATOR LINEAR MOTOR

(71) Applicant: B&R INDUSTRIAL AUTOMATION GMBH, Eggelsberg (AT)

(72) Inventors: Dominic Walter, Salzburg (AT); Christoph Obermair, Salzburg (AT); Stefan Huber, Salzburg (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/587,971

(22) Filed: May 5, 2017

(65) Prior Publication Data
US 2017/0320683 A1 Nov. 9, 2017

(30) Foreign Application Priority Data
May 9, 2016 (AT) .............. A 50428/2016

(51) Int. Cl.
*B65G 35/00* (2006.01)
*B65G 54/02* (2006.01)
(Continued)

(52) U.S. Cl.
CPC .............. *B65G 54/02* (2013.01); *B60L 13/03* (2013.01); *H02K 41/02* (2013.01); *B65G 2207/30* (2013.01)

(58) Field of Classification Search
CPC ........ B60L 13/04; B60L 13/006; B60L 13/06; B60L 13/08; B60L 13/10; B65G 54/00; B65G 54/02
(Continued)

(56) References Cited

U.S. PATENT DOCUMENTS

| 6,568,332 B1 | 5/2003 | Holzinger et al. |
| 6,578,495 B1 * | 6/2003 | Yitts ................ B60L 13/00 104/292 |

(Continued)

FOREIGN PATENT DOCUMENTS

| DE | 195 32 281 | 3/1997 |
| DE | 201 20 576 | 2/2003 |

(Continued)

OTHER PUBLICATIONS

Austria Search Report conducted in Austria Appln. No. A 50428/2016 (dated Dec. 22, 2016).

(Continued)

*Primary Examiner* — James R Bidwell
(74) *Attorney, Agent, or Firm* — Greenblum & Bernstein, P.L.C.

(57) ABSTRACT

Modular transport line system for configuring a transport line of a long stator linear motor. The system includes plural modular transport line components, each having a starting point (An) and an end point (En), wherein the starting point (An) and the end point (En) of each modular transport line component lie on a raster corner point $(p \cdot a) \times (q \cdot a)$ of an $(a \times a)$ raster with a prespecified raster length a, wherein p, q are whole numbers. At least one of the plural modular transport line components is a curved transport line component formed by at least three modules.

20 Claims, 4 Drawing Sheets

(51) Int. Cl.
*H02K 41/02* (2006.01)
*B60L 13/03* (2006.01)

(58) Field of Classification Search
USPC ......... 198/377.02, 463.3, 619, 805; 104/282, 104/283
See application file for complete search history.

(56) References Cited

U.S. PATENT DOCUMENTS

| | | | | |
|---|---|---|---|---|
| 7,458,454 | B2* | 12/2008 | Mendenhall | B65G 35/06 198/377.02 |
| 8,626,329 | B2* | 1/2014 | Dickson | B23P 21/004 198/343.1 |
| 9,511,681 | B2 | 12/2016 | Wernersbach | |
| 9,561,911 | B2 | 2/2017 | Buchmann | |
| 2003/0230941 | A1 | 12/2003 | Jacobs | |
| 2010/0236445 | A1 | 9/2010 | King et al. | |
| 2011/0125307 | A1 | 5/2011 | Dickson et al. | |
| 2013/0026011 | A1 | 1/2013 | Van De Loecht | |
| 2015/0349618 | A1 | 12/2015 | Kleinikkink | |

FOREIGN PATENT DOCUMENTS

| | | |
|---|---|---|
| DE | 10 2010 027 925 | 10/2011 |
| DE | 10 2012 019 717 | 4/2014 |
| EP | 1070786 | 7/2000 |
| WO | 01/38124 | 5/2001 |
| WO | 2015/042409 | 3/2015 |

OTHER PUBLICATIONS

Austrian Office Action conducted in AU Appln. No. A 50428/2016 (dated Aug. 29, 2017).
Europe Search Report conducted in Europe Appln. No. EP 17 17 0074 (dated Aug. 1, 2017).
Austrian Search Report/Office Action (3 pages) conducted in AU Appln. No. A 50428/2016 (dated Apr. 20, 2018).

* cited by examiner

MODULAR SYSTEM OF A PLURALITY OF TRANSPORT LINE COMPONENTS OF A LONG STATOR LINEAR MOTOR

CROSS-REFERENCE TO RELATED APPLICATIONS

The present application claims priority under 35 U.S.C. § 119(a) of Austria Patent Application No. A50428/2016 filed May 9, 2016, the disclosure of which is expressly incorporated by reference herein in its entirety.

BACKGROUND OF THE INVENTION

1. Field of the Invention

The present invention relates to a modular system for the configuration of a transport line of a long stator linear motor, consisting of a plurality of transport line components, wherein each transport line component has a starting point and an endpoint. In addition, the invention relates to a long stator linear motor which has a transport line, and to a transport line of a long stator linear motor, wherein each transport line is made up of a plurality of transport line components of the modular system.

2. Discussion of Background Information

Long stator linear motors are often used as flexible conveyance devices in manufacturing, processing, assembly plants, and similar plants. A long stator linear motor consists, as is known, substantially of a long stator in the form of a plurality of drive coils arranged one behind the other on a stationary construction, and a plurality of transport units with excitation magnets (permanent or electromagnets), which are moved along the long stator. For this purpose, electric current is fed to the drive coils. When current is suitably fed to the drive coils, a moving magnetic field is generated which interacts with the excitation magnets on the transport units to move the transport units according to the known principle of motors. As such, a transport line is constructed by the long stator, along which the transport units can be moved. It is possible in this way to move each transport unit individually and independently of the others (position, speed, acceleration, direction of movement). For this purpose, each drive coil is activated by a drive coil controller which is able to receive specifications regarding movement of a transport unit (e.g. in the form of target values for position or speed) from a higher-level system control device, and then calculate the actuating parameters for the drive coils—particularly coil currents. In this case, deflectors of the long stator linear motor can also be included along the transport line, the same implementing a division to different transport lines or a merging of different transport lines. A conveyor device in the form of a long stator linear motor can therefore have quite complex track configurations.

The long stator and/or a transport line is often also constructed in the form of individual, joined transport line components. This modularity allows a simpler construction of a long stator linear motor, particularly if defined transport line components are used. The constructive embodiment of the long stator linear motor—that is, for example, the design of the drive coils, the conveyor path, the transport units, the guidance of the transport unit, etc.—can of course be variable, although the basic functional principle of a long stator linear motor remains the same. However, the selection of the transport line components in this case is in no way trivial. The fundamental concern is to enable the flexible realization of various transport lines with the least possible transport line components.

Documents WO 2015042409 A1, US 20110125307 A1, US 20030230941 A1 and US 20100236445 A1 for instance disclose transport systems in different embodiments and for different areas of application where long stator linear motors are applied. Single modules in various sizes and shapes are put together to build a transport system. However it is a disadvantage that many different modules of different sizes are necessary to provide a complex and closes transport system. For this reason, the problem addressed by the present invention is that of providing transport line components which can be used to realize various transport lines with few different types, in a flexible manner.

SUMMARY OF THE EMBODIMENTS

This problem is addressed by a modular system, wherein a selection of at least two different transport line components is included in the modular system, wherein the starting point and the end point of each of the at least two different transport line components each lie on a raster corner point $(p \cdot a) \times (q \cdot a)$ of a ($a \times a$) raster with pre-specified raster length a, wherein p, q are whole numbers. As such, various transport lines can be realized with few defined transport line components. The arrangement in a raster makes it possible to ensure in a simple manner that closed transport lines can be realized. A particular advantage of the raster is also that a transport line can be closed, despite the use of various transport line components of the modular system, even when used with different orientations, such that it is possible to realize closed paths in a very simple manner.

Preferred, simple basic elements of the modular system for the selection are a straight transport line component with starting point on raster corner point p, q=0 as the origin and end point on raster corner point p≠0, q=0, or vice versa, a 90° transport line component with starting point on raster corner point p, q=0 as the origin and end point on raster corner point p, q ≠0 or vice versa, and preferably p=q, a 180° transport line component with starting point on raster corner point p, q=0 as the origin and end point on raster corner point p ∈ ℤ, q≠0 or vice versa and/or an S-shaped transport line component with starting point on raster corner point p, q=0 as the origin and end point on raster corner point p, q ≠0 or vice versa. Virtually any transport line can be realized by means of these simple basic shapes.

The design of the transport line components is made more flexible if a transport line component is included in the modular system which is composed of two curve entry modules on which is included the starting point or the end point, and at least one connection module which connects the two curve entry modules. In this way, it is possible to realize different transport line components by designing the curve entry modules and/or the connection modules differently, while nevertheless preserving the prespecified raster dimensions. In particular, a curve entry module can be easily combined with different connection modules.

In order to prevent a curvature step between two adjacent transport line components or between a curve entry module and connection module, the curvature radius of one end of each curve entry module is preferably infinite, and the other respective end of the curve entry module preferably has a prespecified curvature radius greater than zero, and the connection module has the same prespecified curvature radius on both ends.

The flexibility in the design of the transport line components can be further increased if the connection module is composed of a plurality of circular-segment-modules, wherein each circular-segment-module has the same curvature radius on both ends. In this way, it is possible to once again prevent disadvantageous curvature steps at the transitions between the individual circular-segment-modules.

An S-shaped transport line component without disadvantageous curvature steps can be realized in a simple manner with a connection module which has the same prespecified curvature radius on both ends, with curvatures in different directions.

As an alternative, an S-shaped transport line component can be composed of two curve entry modules connected to each other. In order to prevent curvature steps, the curvature radius of one end of each curve entry module can be infinite, and the other respective end of the curve entry module can have an identical prespecified curvature radius greater than zero, with curvature in different directions.

BRIEF DESCRIPTION OF THE DRAWINGS

The present invention is described in greater detail below with reference to FIGS. 1 to 7, which show exemplary, schematic, and non-restrictive advantageous embodiments of the invention, wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
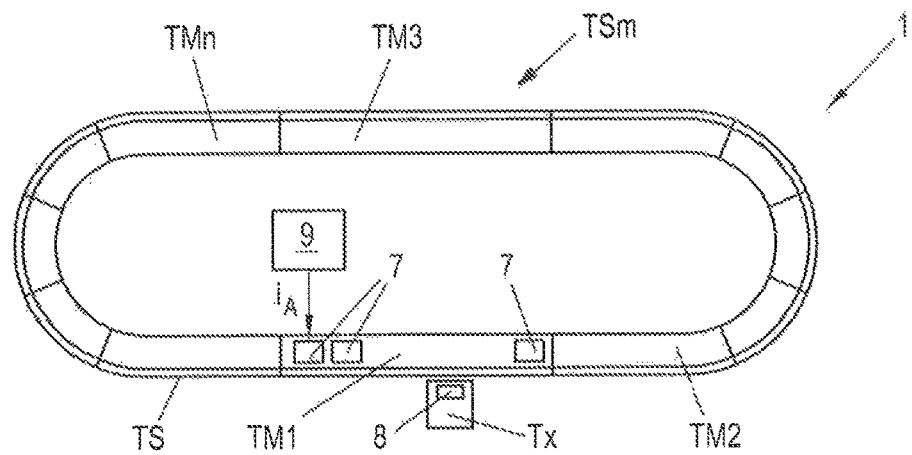
FIGS. 1 and 2 show embodiments of a long stator linear motor with transport lines.

A simple example of a long stator linear motor 1 is illustrated in FIG. 1. The long stator linear motor 1 in this case is designed as a closed transport line TSm. The transport line TSm is formed from a number n>1 of transport line components TM1, ..., TMn which are arranged in series. A plurality of drive coils 7 is arranged on a transport line component TMn, to which coil current iA (as a vector in amount and direction) is fed, controlled by a control unit 9 (only illustrated for one drive coil 7), to generate a moving magnetic field. At least one transport unit Tx is moved along the transport line TS. The transport unit Tx is guided for this purpose in a suitable manner on the stationary transport line TS. In addition, at least one excitation magnet 8, preferably a permanent magnet, is arranged on the transport unit Tx, and interacts with the generated moving magnetic field to move the transport unit Tx along the transport line TS. Of course, more than one transport unit Tx can be moved along the transport line TS, wherein each transport unit Tx can be moved by corresponding current fed to the drive coils 7 in the region of the transport unit Tx, independently of other transport units Tx (in direction, position, speed, and acceleration). This functional principle of a long stator linear motor 1 is known as such, such that no further detail shall be provided here.

Of course, a transport line component TMn, with drive coils 7, can be provided on both sides of a transport unit Tx (relative to the direction of movement). In this case, the transport unit Tx preferably has at least one excitation magnet 8 on both sides.

Figure 2:
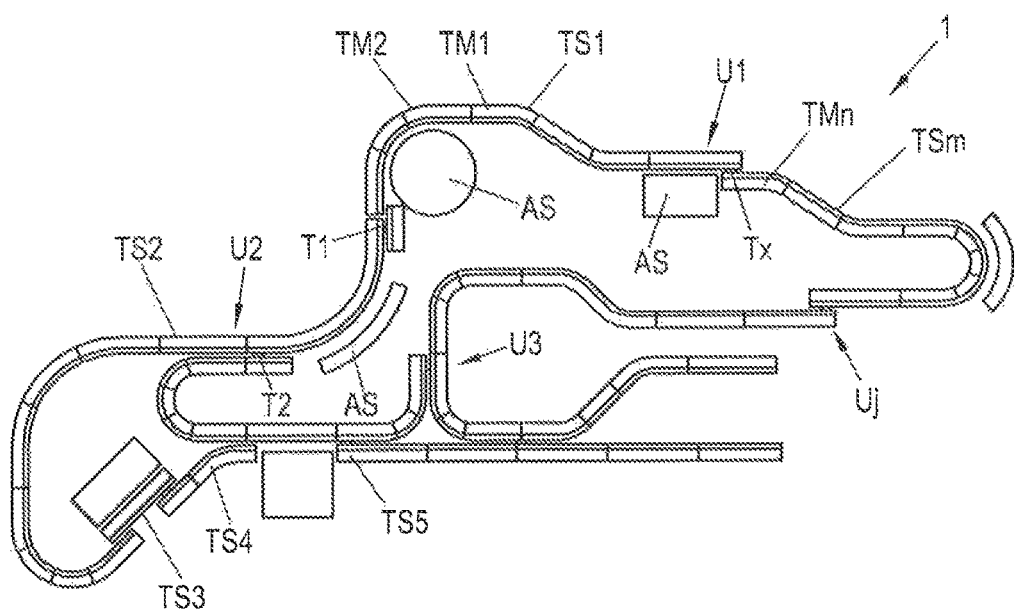

FIG. 2 shows a long stator linear motor 1 with a complex construction, wherein the drive coils 7 and the excitation magnets 8 are not illustrated so as to simplify the drawing. In this case, multiple, open transport lines TSm, m>1 (to simplify the drawing, not all transport lines TSm have been indicated) are used, together forming a path of the long stator linear motor 1. The transport lines TSm in this case are again formed from different transport line components TMn. A transport unit Tx, x≥1 can be moved along the transport lines TSm. The individual transport lines TSm are connected to each other by transfer points Uj, j>1 (in this case as well, not all transfer points Uj are indicated in the drawing), wherein the transport lines TSm partially overlap. A transfer point Uj can be designed as a deflector, such as the transfer points U2, U3, for example, but can also be designed as a simple change from one transport line TSm to another transport line TSm, such as the transfer points U1, Uj, for example. At a deflector, there is a division to different transport lines TS or a merge of different transport lines TS. Different work stations AS can also be arranged along the transport lines TS, where a transport unit Tx can be passed through or halted. Certain manipulations can be performed in the work stations AS on components which are moved by a transport unit Tx. A work station AS in this case can also be designed for gating transport units Tx into or out of a transport line TS.

To make it possible to easily—but nonetheless flexibly—construct a transport line TS of a long stator linear motor 1, a modular system is provided which consists of different, predefined transport line components TMn, wherein at least two different transport line components TMn can be selected. For the construction of the modular system, a raster length a is defined, from which originates an imaginary raster a×a.

Figure 3:
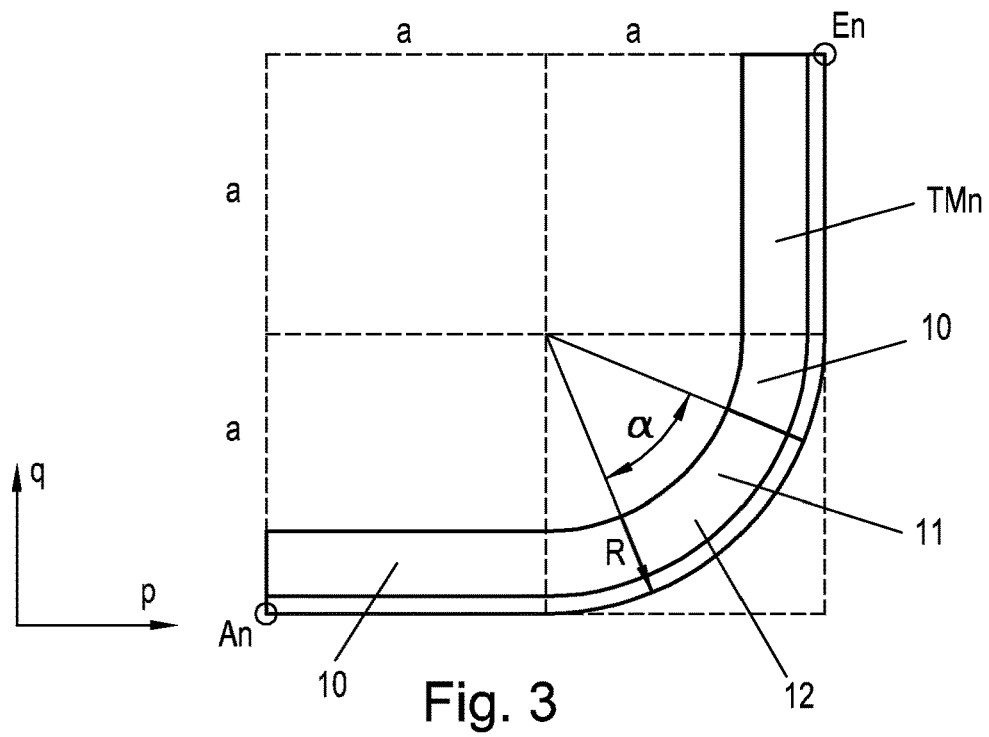
FIG. 3 shows a 90°-bend transport line component of the modular system.
Figure 4:
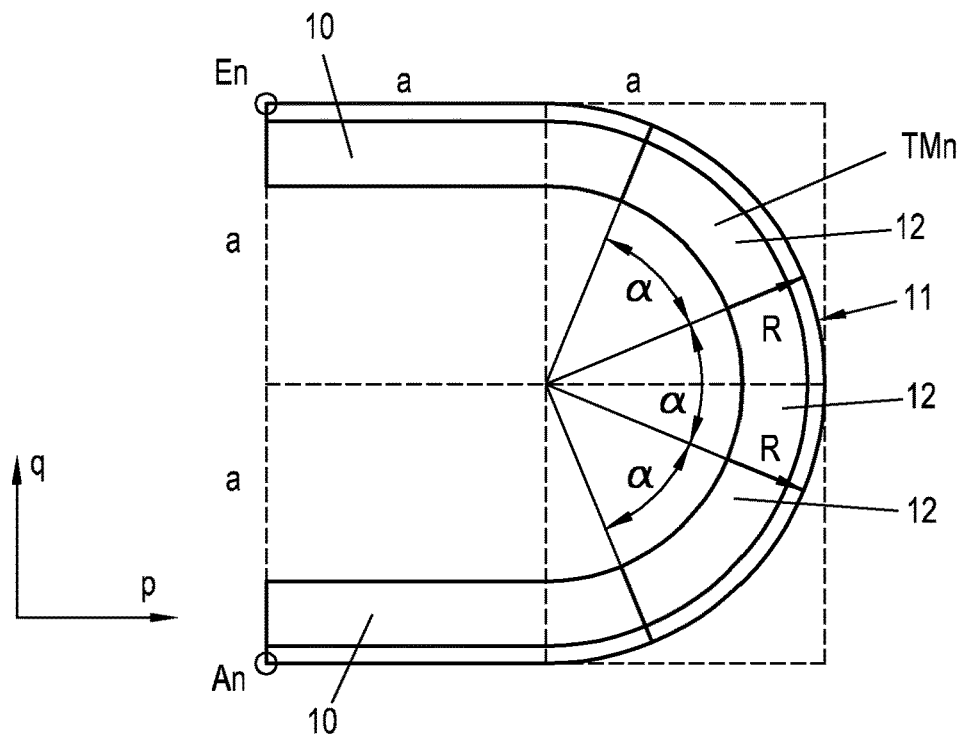
FIG. 4 shows a 180°-bend transport line component of the modular system.

Each transport line component TMn has a starting point An and an end point En, as illustrated in FIGS. 3 and 4 using the example of a 90° bend and a 180° bend. The transport line components TMn are connected to build a transport line TSm in such a manner that the starting point An and end point En of each adjacent transport line component TMs coincide. The starting point An and end point En of a transport line component TMn can naturally be exchanged for each other. In addition, it should be noted that the double line on the transport line component TMn in the figures is only symbolic, and indicates the side along which a transport unit Tx is guided and/or moved; consequently, there is an inner and an outer guideway for a transport unit Tx. The starting point An and end point En in this case are on the side along which the one transport unit Tx is guided and/or moved.

Each starting point An and end point En of a transport line component TMn of the modular system lies on a raster corner point (p·a)×(q·a) of the (a×a) raster, wherein p, q are whole numbers (p, q $\in \mathbb{Z}$). In this case, a raster corner point must be taken as the origin, with the raster constructed beginning at that point. The origin in this case is preferably selected, for reasons of simplicity (but not obligatorily) in such a manner that p, q do not need to change signs for different raster corner points (p·a)×(q·a). The raster in FIG. 3 therefore has, by way of example, the nine raster corner points (0·a)×(0·a) (corresponding to the origin), (1·a)×(0·a), (2·a)×(0·a), (0·a)×(1·a), (1·a)×(1·a), . . . , (2·a)×(2·a). In the case of FIG. 3, the starting point An of the transport line component TMn lies, in the form of a 90° bend, on the raster corner point where p=q=0, for example, and the end point En lies on the raster corner point where p=q=2. If the origin were, by way of example, at the end point En, then the starting point An of the transport line component TMn as in FIG. 3 would lie, by way of example, on the raster corner point where p=q=−2. In general, for the starting point An or end point En of a 90° bend, p, q ≠0. In the case of FIG. 4, the starting point An of the transport line component TMn lies, by way of example, on the raster corner point where p=q=0, and the end point En lies on the raster corner point where p=0, q=2. The 180° bend in FIG. 4 could of course also be defined in such a manner that, by way of example, p=1, q=2 is selected for the end point En. In general, for the starting point An or end point En of a 180° bend, p $\in \mathbb{Z}$, q ≠0.

A transport line component TMn can also be constructed of two curve entry modules 10 on which the starting point An or the end point En is included, and at least one connection module 11 which connects the two curve entry modules 10, as illustrated in FIGS. 3 and 4. The advantage of this is that different transport line components TMn can be generated from the curve entry modules 10 with different connection modules 11. For this purpose, the connection module 11 itself can also be subdivided, for example in the form of multiple circular-segment-modules 12, as illustrated in FIG. 4.

A circular-segment-module 12 in the form of a circular arc spans an angle of, by way of example, α=45°. If at this point the curve entry module 10 implements an angle change of the transport line (as seen in the direction of movement) of 22.5°, then it is possible to span both a 90° bend (FIG. 3) and a 180° bend (FIG. 4) with such curve entry modules 10 and circular-segment-modules 12 with a bend angle α=45°. A connection module 11 consisting of three circular-segment-modules 12 which is connected to two curve entry modules 10 then produces a 180° bend. A connection module 11 consisting of a circular-segment-module 12 and two curve entry modules 10 connected thereto produces a 90° bend. Other divisions are, of course, possible. By way of example, a 90°-angle or 135°-angle circular-segment-module 12 could be included.

In this case, it is particularly advantageous if a curve entry module 10 implements an angle change to achieve a curve with a curvature radius from infinite (zero curvature) on one end of the curve entry module 10 to a curvature radius R (curvature: 1/R) on the other end of the curve entry module 10. In this case, the curvature can be increased as continuously as possible to 1/R, by implementing a curve in the form of a spline (e.g. a 5th degree polynomial), by way of example. If the curvature were to change in steps, this would mean a jump in the centrifugal acceleration for a transport unit Tx which is moving along a transport line component TMn with a curve entry module 10. This would load the mechanism of the transport unit Tx and/or the guidance of the transport line TSm, and increase wear. In this context, it is also advantageous if the curvature on one end of the curve entry module 10 and the curvature on one end of the connection module 11, and/or a circular-segment-module 12, are the same, since in this case as well there is no step in the curvature of the transport line component TMn if the curve entry module 10 and the connection module 11 and/or the circular-segment-module 12 are combined. After the circular-segment-module 12 is preferably implemented in a circular arc with a radius R, the curvature on the ends of the curve entry module 10 is preferably likewise 1/R.

A straight transport line component TMn is also expediently defined, with p ≠0, q=0. The length of the straight transport line component TMn therefore corresponds to the number of the raster lengths a between the starting point An and the end point En.

Figure 5:
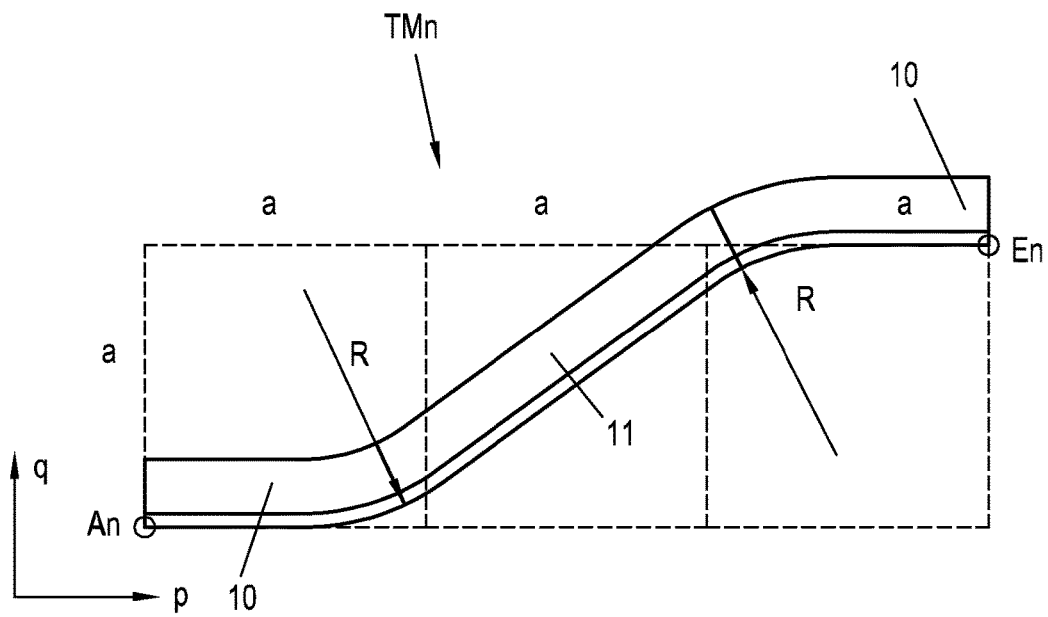
FIGS. 5 and 6 show S-curve transport line components of the modular system.

Likewise, an S-shaped transport line component TMn can be defined in the modular system, as illustrated in FIG. 5. The starting point An of the S-shaped transport line component TMn lies, by way of example, at the origin, where p=q=0, and the end point En lies on a raster corner point, where p, q ≠0—by way of example p=3, q=1 as in FIG. 5. The S-shaped transport line component TMn preferably has zero curvature on the two ends (starting point An and end point En), which enables a simple connection to a further transport line component TMn of the modular system. Between the two ends, the curvature switches at least once from positive to negative in order to realize the S-shape. The curvature preferably switches back continuously along the transport line component TMn in order to avoid a curvature step. In this case, two curve entry modules 10 and one connection module 11 (including with further subdivisions) can again be connected to form a transport line component TMn, as illustrated in FIG. 5. In this case it is particularly advantageous if the same curve entry module 10 is used for the 90° or 180° component. Only one connection module 11 needs to be established in this case to realize the S curve. The connection module 11 in this case preferably has two ends with a curvature which corresponds to the curvature of the adjacent curve entry module 10—for example 1/R as in FIG. 5. The curve formed by the S-shaped transport line component TMn can in turn be modelled by means of a suitable spline. The guidance can switch from inside to outside as a result of the S-shaped transport line component TMn, of course.

Figure 6:
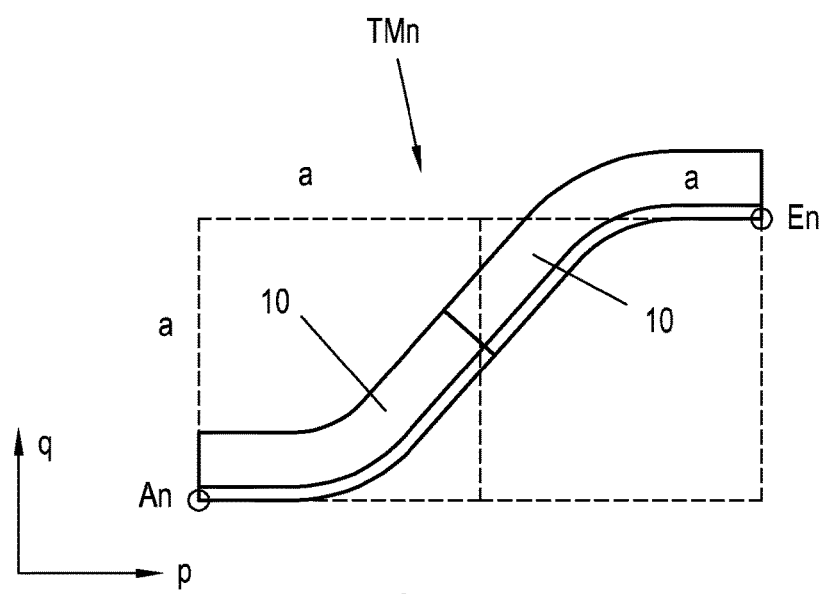

An alternative design of an S-shaped transport line component TMn is illustrated in FIG. 6, formed from two curve entry modules 10 which are connected to each other. The two ends of this curve entry module 10 preferably each have zero curvature, which in turn enables a simple connection, wherein the curvature in-between preferably changes continuously. The end point En of this S-shaped transport line component TMn lies on the raster corner point where p=2, q=1, by way of example.

Each transport line component TMn could of course be rotated by ±90°, which would change nothing in the general definitions above.

Figure 7A:
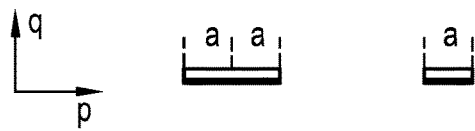
FIGS. 7*a*-7*g* show an example of a modular system with various transport line components.
Figure 7B:
Figure 7C:
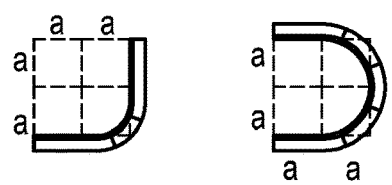
Figure 7D:
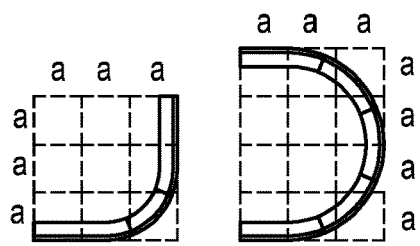
Figure 7E:
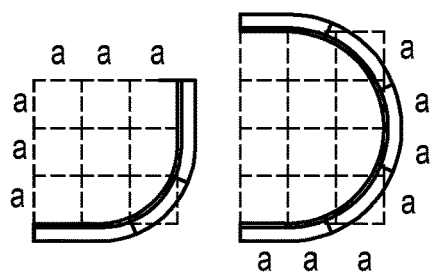
Figure 7F:
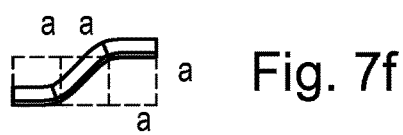
Figure 7G:

FIGS. 7a-7g illustrate a possible modular system with a selection of transport line components TMn. The raster corner point at bottom left is taken as the origin in this case. For improved clarity, the starting point An and the end point En are not indicated. FIG. 7a shows two straight transport line components TMn with length a and 2a (q=0, p=1 or 2). FIG. 7b shows at left a 90° bend with starting point An (or end point En) at the origin where p=q=0, and end point En (or starting point An) at the raster corner point p=q=2, and an outside guidance. FIG. 7b shows at right a 180° bend with starting point An (or end point En) at the origin where p=q=0, and end point En (or starting point An) at the raster corner point p=0, q=2, and an outside guidance. FIG. 7c shows a 90° bend and a 180° bend as in FIG. 7b, and an inside guidance. FIG. 7d shows at left a 90° bend with starting point An (or end point En) at the origin where p=q=0, and end point En (or starting point An) at the raster corner point p=q=3, and an outside guidance. FIG. 7d shows at right a 180° bend with starting point An (or end point En) at the origin where p=q=0, and end point En (or starting point An) at the raster corner point p=0, q=4, and an outside guidance. FIG. 7e shows the same as FIG. 7d, with an inside guidance. FIGS. 7f and 7g show S-shaped transport line components TMn with starting point An (or end point En) at the origin where p=q=0, and end point En (or starting point An) at the raster corner point p=3, q=1 in FIG. 7f, and p=2, q=1 in FIG. 7g. A long stator linear motor 1 according to FIG. 1 or 2 can be constructed, by way of example, with the transport line components TMn in the modular system.

The following considerations can be made when sizing the transport line component TMn and/or determining the raster length a. A transport line component TMn bears a number of drive coils 7. The drive coils 7 have a known dimension (length). As such, the component length (length, in the case of a straight line; arc length, in the case of a circular arc; etc.) of a transport line component TMn should be to the greatest extent possible a whole-number multiple of the dimension of the drive coil 7 in order to prevent sections along the transport line component TMn without drive coils 7 being too long. This is because no magnetic field can be established in such sections, and no force can be exerted on the transport unit Tx. In addition, a curvature radius R should not be too small, which would admittedly make the construction more compact, but also would increase centrifugal forces (and therefore the mechanical load) during travel through the transport line component TMn at a constant speed. In a concrete implementation, the raster length was determined to be a=315=, with a curvature radius of R=307.5775 mm. On this raster length a, 21 drive coils 7 with a length of 15 mm can be accommodated. 8 drive coils 7 can be arranged on a circular arc segment 12 with an opening angle of $\alpha$=45°.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A modular transport line system for configuring a transport line of a long stator linear motor, said system comprising:
plural modular transport line components, each having a starting point (An) and an end point (En), wherein the starting point (An) and the end point (En) of each modular transport line component lie on a raster corner point (p·a)×(q·a) of an (a×a) raster with a prespecified raster length a, wherein p, q are whole numbers; at least one of the plural modular transport line components being a curved transport line component formed by at least three modules; and
said at least three modules comprise:
a first module that is a curve entry module having the starting point (An) and a first curved portion of the curved transport line component;
a second module that is a curve entry module having the end point (En) and a second curved portion of the curved transport line component;
a third module that is a connection module, connecting the first and second modules of the curved transport line component and having a third curved portion of the curved transport line component;
said first module having a straight end section extending to the starting point (An) and a curved end section that abuts a first curved end section of the third module; and
said second module having a straight end section extending to the end point (En) and an curved end section that abuts a second curved end section of the third module,
wherein, where the first module and the third module abut, the curved end section of the first module and the first curved end section of the third module have a same curvature, and
wherein, where the second module and the third module abut, the curved end section of the second module and the second curved end section of the third module have a same curvature.

2. The modular transport line system of claim 1, further comprising a straight transport line component being formed by at least one straight module, said straight transport line component having a first straight end section having a starting point (An) and a second straight end section having an end point (En).

3. The modular transport line system of claim 1, wherein the third module of the curved transport line component comprises an acute angle section of the curved transport line component.

4. The modular transport line system of claim 1, wherein the curved transport line component is a 90° curved transport line component.

5. The modular transport line system of claim 1, wherein the curved transport line component is a 180° curved transport line component.

6. The modular transport line system of claim 1, wherein the curved transport line component is a partially circular transport line component defined by a radius (R), wherein the first curved portion of the first module, the second curved portion of the second module and the third curved portion of the third module have a same radius.

7. The modular transport line system of claim 6, wherein the third module is formed by more than one abutting circular-arc-segment-modules.

8. The modular transport line system of claim 1, wherein the curved transport line component is configured to form an S-shaped transport line component, wherein the first curved end section and the second curved end section of the third module have curvatures in opposite directions.

9. The modular transport line system of claim 1, further comprising an S-shaped transport line component which is formed by the first module and the second module as curve entry modules, wherein the curved end section of said first module abuts the curved end section of said second module, wherein the straight end section of the first module having a starting point (An) and the straight end section of the second module having an end point (En) and face in opposite directions.

10. A transport line for a long stator linear motor comprising:
- at least one curved modular transport line component having a starting point (An) and an end point (En), wherein the starting point (An) and the end point (En) of said curved modular transport line component lie on a raster corner point (p·a)×(q·a) of an (a×a) raster with a prespecified raster length a, wherein p, q are whole numbers;
- said at least one curved transport line component being formed by at least three modules arranged in series;
- said at least three modules comprising:
  - a first module that is a curve entry module having the starting point (An) and a first curved portion of the curved transport line component;
  - a second module that is a curve entry module having the end point (En) and a second curved portion of the curved transport line component;
  - a third module that is a connection module connecting the first and second modules of the curved transport line component and having a third curved portion of the curved transport line component;
- said first module having a straight end section extending to the starting point (An) and a curved end section that abuts a first curved end section of the third module;
- said second module having a straight end section extending to the end point (En) and a curved end section that abuts a second curved end section of the third module,
- wherein, where the first module and the third module abut, the curved end section of the first module and the first curved end section of the third module have a same curvature, and
- wherein, where the second module and the third module abut, the curved end section of the second module and the second curved end section of the third module have a same curvature.

11. The transport line of claim 10, further comprising at least one modular transport line component being a straight transport line component being formed by at least one module, said straight transport line component having a first straight end section having a starting point (An) and a second straight end section having an end point (En).

12. The transport line of claim 10, further comprising at least one modular transport line component being an S-shaped transport line component which is formed by the first module and the second module as curve entry modules, wherein the curved end section of said first module abuts the curved end section of said second module, wherein the straight section of the first module having a starting point (An) and the straight section of the second module having an end point (En) and face in opposite directions.

13. The transport line of claim 10, wherein the curved transport line component is a partially circular transport line component defined by a radius (R), wherein the first curved portion of the first module, the second curved portion of the second module and the third curved portion of the third module have the same radius.

14. The transport line of claim 13, wherein the third module is formed by more than one abutting circular-arc-segment-modules.

15. The transport line of claim 13, wherein the partially circular transport line components include one of:
- a 90 degree curved transport line component; or
- a 180 degree curved transport line component.

16. The transport line of claim 13, wherein the third module of the partially circular transport line component comprises an acute angle section of the curved transport line component.

17. The transport line of claim 10, wherein the curved transport line component is configured to form an S-shaped transport line component, wherein the first curved end section and the second curved end section of the third module have curvatures in opposite directions, wherein the straight section of the first module having the starting point (An) and the straight section of the second module having the end point (En) and face opposite directions.

18. The transport line of claim 10, wherein the plural modular transport line components form a closed transport line.

19. A long stator linear motor comprising a transport line formed by a plurality of modular transport line components arranged in series, each modular transport line component having a starting point (An) and an end point (En), wherein the starting point (An) and the end point (En) of each modular transport line component lie on a raster corner point (p·a)×(q·a) of an (a×a) raster with a prespecified raster length a, wherein p, q are whole numbers;
- at least one of the plurality of modular transport line components being a curved transport line component being formed by at least three modules arranged in series; and
- said at least three modules of the curved transport line component comprises:
  - a first module that is a curve entry module having the starting point (An) and a first curved portion of the curved transport line component;
  - a second module that is a curve entry module having the end point (En) and a second curved portion of the curved transport line component; and
  - a third module that is a connection module connecting the first and second modules of the curved transport line component and having a third curved portion of the curved transport line component;
- said first module having a straight end section extending to the starting point (An) and a curved end section that abuts a first curved end section of the third module; and
- said second module having a straight end section extending to the end point (En) and a curved end section that abuts a second curved end section of the third module,
- wherein, where the first module and the third module abut, the curved end section of the first module and the first curved end section of the third module have a same curvature, and
- wherein, where the second module and the third module abut, the curved end section of the second module and the second curved end section of the third module have a same curvature.

20. A modular transport line component for building a transport line of a long stator linear motor, said modular transport line component being a curved transport line component that is formed by at least three modules arranged in series; and
- said at least three modules of the curved transport line component comprises:
  - a first module that is a curve entry module having the starting point (An) and a first curved portion of the curved transport line component;
  - a second module that is a curve entry module having the end point (En) and a second curved portion of the curved transport line component; and a third module that is a connection module connecting the first and second modules of the curved transport line component and having a third curved portion of the curved transport line component;

said first module having a straight end section extending to the starting point (An) and a curved end section that abuts a first curved end section of the third module; and said second module having a straight end section extending to the end point (En) and an curved end section that abuts a second curved end section of the third module, wherein, where the first module and the third module abut, the curved end section of the first module and the first curved end section of the third module have a same curvature, and wherein, where the second module and the third module abut, the curved end section of the second module and the second curved end section of the third module have a same curvature.

* * * * *